United States Patent [19]

Goergen

[11] Patent Number: 4,462,445

[45] Date of Patent: Jul. 31, 1984

[54] PNEUMATIC TIRE TREAD

[75] Inventor: René Goergen, Colmar-Berg, Luxembourg

[73] Assignee: The Goodyear Tire & Rubber Company, Akron, Ohio

[21] Appl. No.: 371,104

[22] Filed: Apr. 23, 1982

[51] Int. Cl.³ .............................................. B60C 11/06
[52] U.S. Cl. ............................ 152/209 R; DIG. 2/140
[58] Field of Search ....................... 152/209 R, 209 D; DIG. 2/140, 131, 142, 150

[56] References Cited

U.S. PATENT DOCUMENTS

| 1,956,011 | 4/1934 | Evans | 152/209 R |
| 2,454,750 | 11/1948 | Woods | 152/209 R |
| 3,004,578 | 10/1961 | Braudorn | 152/209 R |
| 4,327,792 | 5/1982 | Landers | 152/209 R |

FOREIGN PATENT DOCUMENTS 2814945  10/1978  Fed. Rep. of Germany ... 152/209 D

Primary Examiner—Michael W. Ball
Attorney, Agent, or Firm—Frank Pincelli

[57] ABSTRACT

A pneumatic tire comprising at least two rows of alternating rib and block portions. The relief elements of the block portions have an area between twenty percent (20%) and sixty-five percent (65%) of the net contact area of the tire.

7 Claims, 5 Drawing Figures

PNEUMATIC TIRE TREAD

The foregoing abstract is not to be taken as limiting the invention of this application, and in order to understand the full nature and extent of the technical disclosure of this application, reference must be made to the accompanying drawings and the following detailed description.

BACKGROUND OF THE INVENTION

This invention relates to pneumatic tires and more particularly to a pneumatic radial truck tire.

It is well known in the tire industry that the choice of particular tread pattern involves trade-offs between specific tire performance characteristics. For example, a block type tread design generally provides good mud and snow or off the road traction; however, block type designs are prone to uneven wear, particularly when mounted on the free rolling axles such as the front and trail positions of a tractor trailer unit. On the other hand, a rib type tire, that is, a tire having a plurality of substantially continuous circumferential ribs about the tread generally provides good wear characteristics and tracking qualities which are generally obtained at the expense of traction.

Applicants have discovered a particular tread configuration which has the good wear and tracking qualities of a rib type tire and the good traction qualities generally attributed to block type patterns.

DETAILED DESCRIPTION OF THE INVENTION

Figure 1:
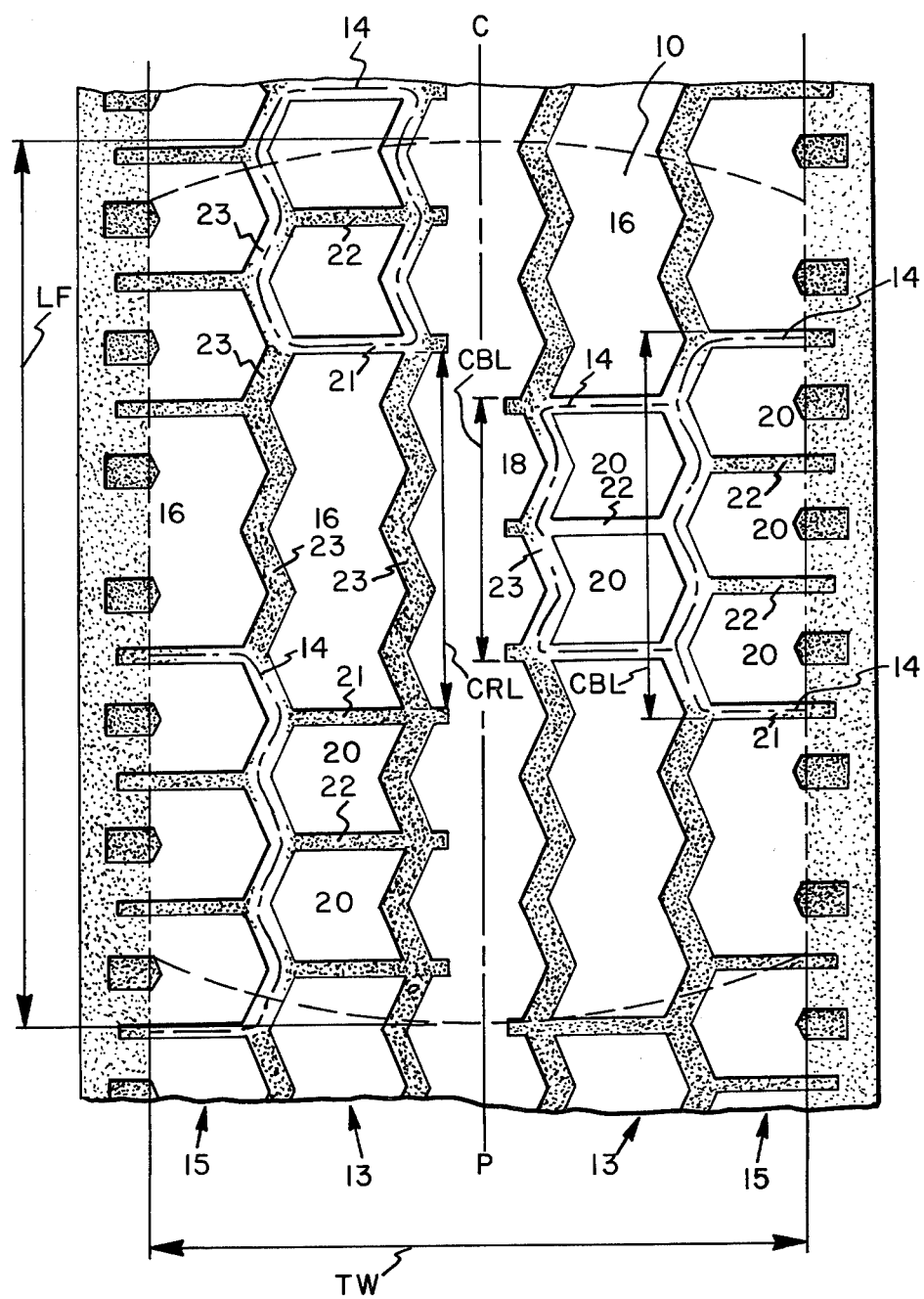
FIG. 1 is a fragmentary plan view of the tread portion of a pneumatic tire made in accordance with the present invention.

Referring to FIG. 1, there is illustrated a portion of a tread 10 for a pneumatic truck tire, preferably of the radial type construction. For the purposes of this invention, a truck tire shall be considered a tire having a nominal rim diameter of at least 15 inches and preferably of at least 18 inches. Also for the purposes of this invention, a radial type construction is a tire wherein the cords of the reinforcing structure which extend from bead to bead are disposed at an angle in the range of 75° to 90° with respect to the mid-circumferential centerplane of the tire. The tread 10 is provided with four circumferentially extending rows of relief elements, two shoulder rows 15 and two intermediate rows 13. Each shoulder or intermediate row comprising circumferentially alternating block portions 14 as shown by dash lines and rib portions 16. Rib portions 16 and block portions 14 being separated by a groove 21 which remains open when in the footprint of the tire. The central portion of the tread 10 is provided with a rib 18 which extends about the circumference of the tire. While the particular embodiment illustrated in FIG. 1 illustrates four rows of relief elements, the present invention only requires at the least two rows. Preferably, at least four rows as illustrated are disposed in the tread 10.

The rib portions 16 each comprise a single continuous ground-engaging tread element having a circumferential length CRL of between 20% and 200% of the length LF of the footprint of the tire, preferably between 20% and 100%. The circumferential length CBL of block portions 14 is also between 20% and 200% of the footprint length LF of the tire; preferably between 20% and 100%. The dash line of FIG. 1 illustrates the overall outline of the footprint of the tire. The maximum tread width TW being the maximum axial width of the tread measured perpendicular to the mid-circumferential centerplane CP as taken from the footprint of the tire inflated to recommended pressure and at rated load. In the particular embodiment illustrated, the length CRL of rib portions 16 in each intermediate row 13 is approximately 50% of the footprint length LF and the length CRL of rib portions 16 in each shoulder row 15 is approximately 35% of the footprint length LF. The circumferential length CBL of block portions 14 in each intermediate row is approximately 35% of the footprint length LF and the length CBL of block portion in each shoulder row 15 is approximately 50% of the footprint length LF. For the purposes of this invention, the circumferential length LF of the footprint is the maximum length of the footprint of the tire measured parallel to the mid-circumferential centerplane CP of the tire as taken from footprint of the tire inflated to design inflation pressure and loaded at rated load.

Figure 2:
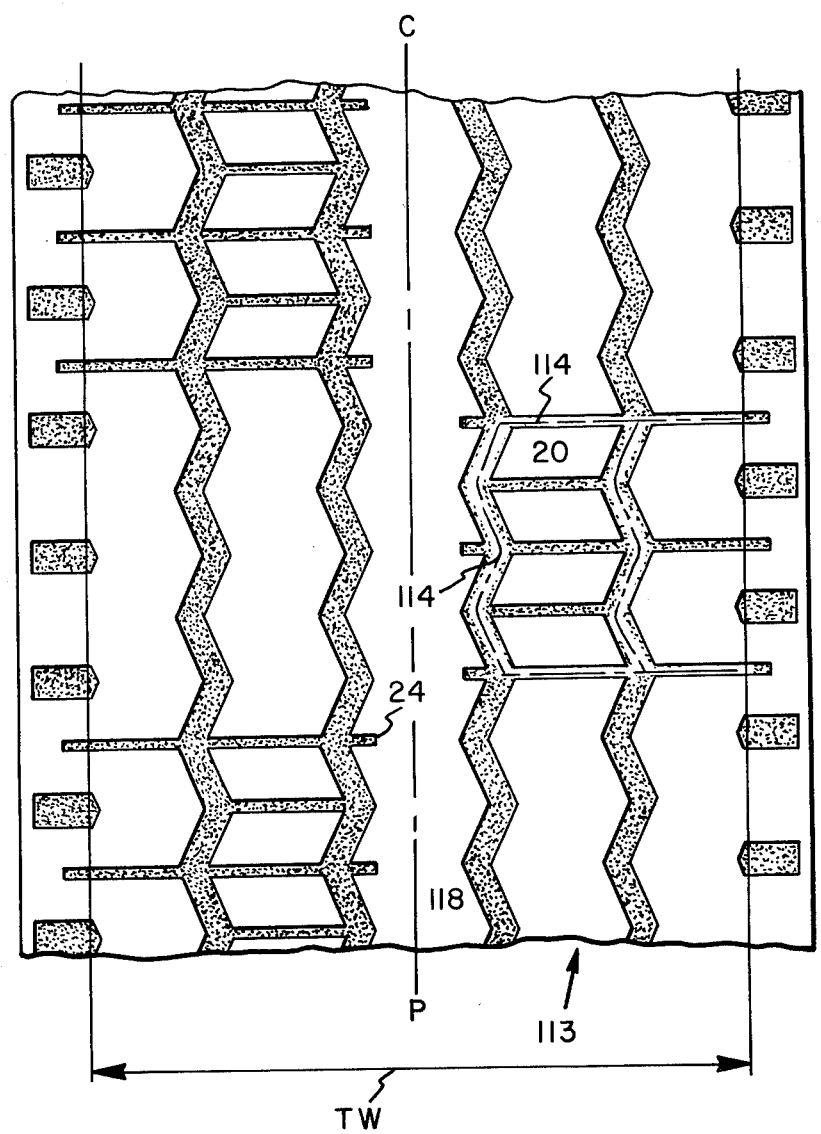
FIGS. 2–5 are fragmentary plan views of modified embodiments of tread designs made in accordance with the present invention.
Figure 3:
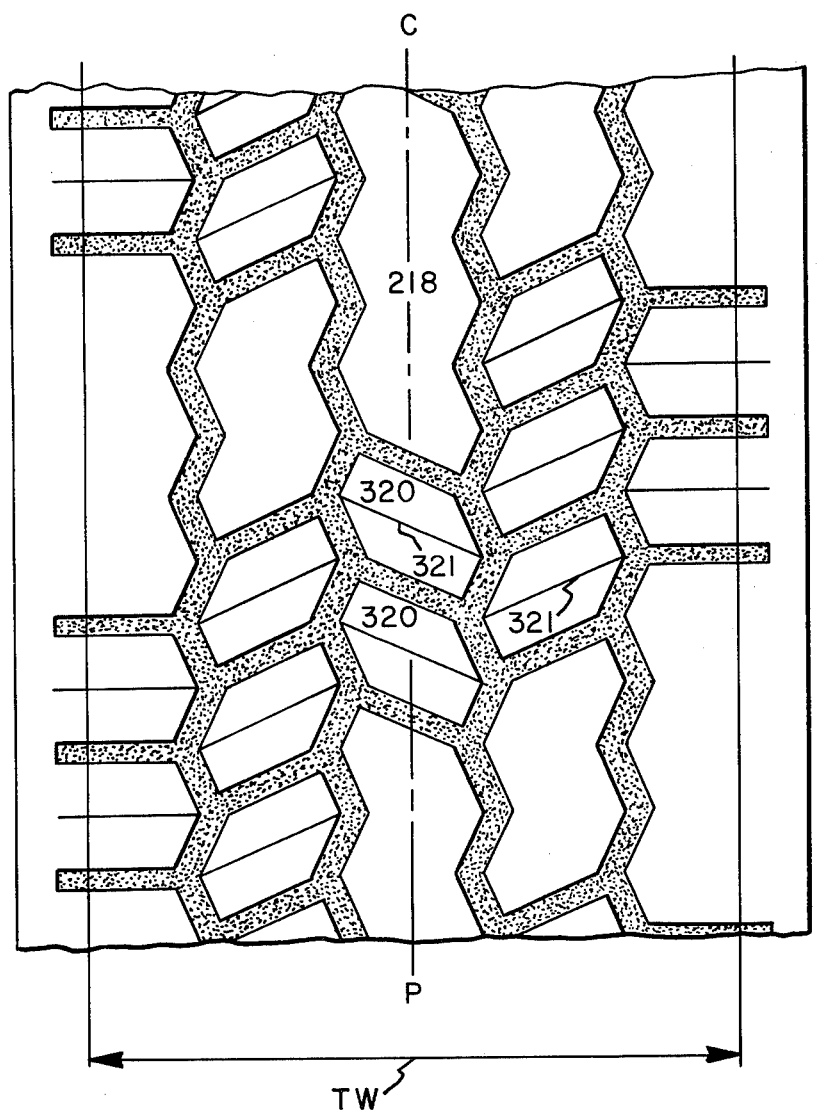
Figure 4:
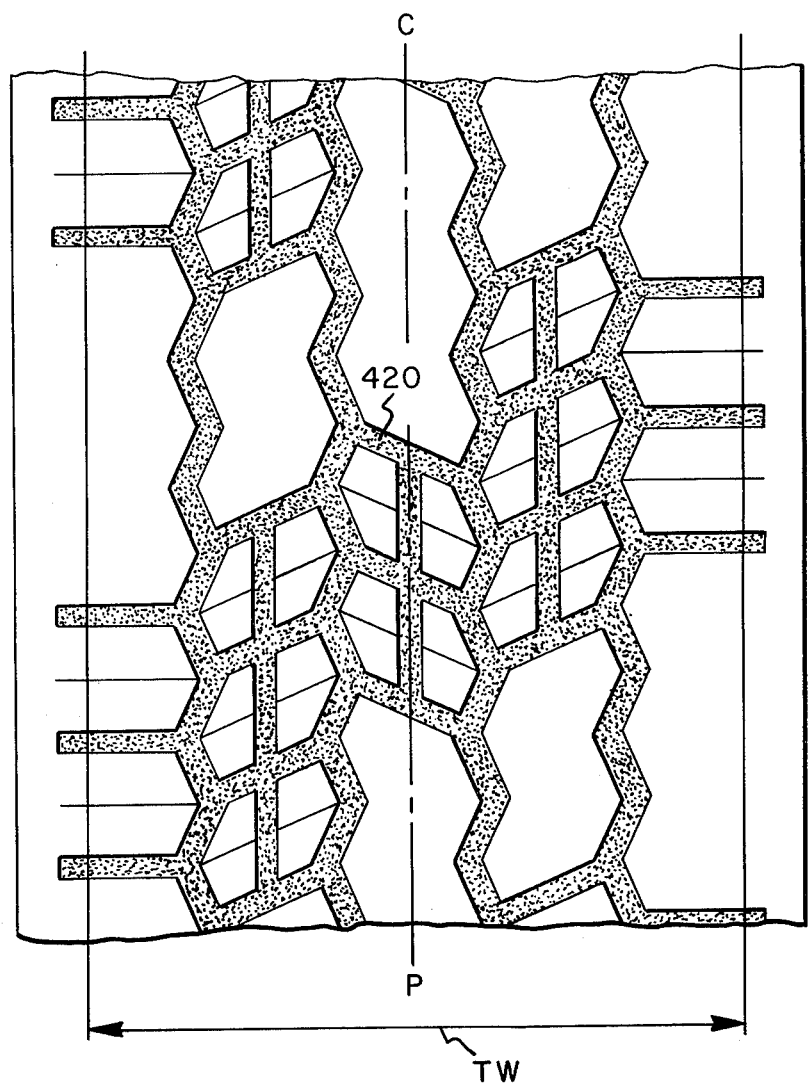

The block portions 14 each comprise at least two separate circumferentially extending relief elements 20 separated by a groove 22. The grooves 22 each have a width so that it will not close up at the tread surface when in the footprint of the tire. Depending upon the circumferential length of block portions 14, block portions 14 may comprise any desired member of separate circumferential relief elements 20. For example, as illustrated in FIGS. 2, 3 and 4, there may be provided either two, three or four relief elements 20 in block portions 14 in rows 13 or 15.

In the embodiment illustrated in FIG. 1, the rows of relief elements are separated by circumferentially extending grooves 23, preferably having a zig-zag configuration as is illustrated in FIG. 1. Grooves 23 each have a width such that when in the footprint of the tire they do not close up at the tread surface.

The block portions 14, rib portions 16, grooves 22 and grooves 23 each have a configuration such that the net contact area of the footprint of the tread of the tire is substantially constant during rotation of the tire, generally the net contact area should not vary by more than approximately 20% and preferably by no more than 10%. For the purposes of this invention, the net contact area of the tire is that portion of the tread which comes in contact with the ground-engaging surface as a percentage of the total footprint area. The tread portion comprises a sufficient number of rib and block portions such that the net contact area of the tire is comprised of at least 20% of relief elements 20 and generally no greater than about 65%. Preferably, the relief elements 20 have a ground-engaging surface area which comprises between 30% to 50% of the net contact area of the footprint and in the particular embodiment illustrated in FIG. 1, relief elements 20 comprise approximately 35% of the net contact area.

By providing rows of alternating block portions and rib portions in the manner taught by applicants, a tread pattern is obtained which has good traction characteristics associated with block type patterns yet minimizes uneven wear associated with block type patterns. Additionally, a tread design made in accordance with the present invention has good tracking qualities, that is, the tendency to keep the tire traveling in a substantially straight direction thereby providing stability to the tire and good wear properties. Additionally, the tread of the present invention has the benefit of being capable of being used in all seasons of the year and in all positions on truck vehicles such as tractor trailers used on the highway.

As previously noted, FIGS. 2, 3, 4 and 5 illustrate various forms of the present invention. FIG. 2 illustrates a tread pattern wherein notches 24 are provided in circumferentially continuous rib portions 118. Additionally, as noted earlier, block portions 114 may be provided with four relief elements 20 as illustrated in intermediate row 113 having relief elements 120.

In FIG. 3, there is illustrated a modified form of the present invention wherein the central portion of the tread is provided with a row of alternating block portions and rib portions. Additionally, FIG. 3 illustrates independent relief elements 320 being provided with narrow grooves or blades 321. For the purposes of this invention, narrow grooves or blades shall be considered grooves which close up at the ground-engaging surface when in the footprint of the tire.

FIG. 4 illustrates a modified design wherein the relief elements 420 are also divided circumferentially.

Figure 5:
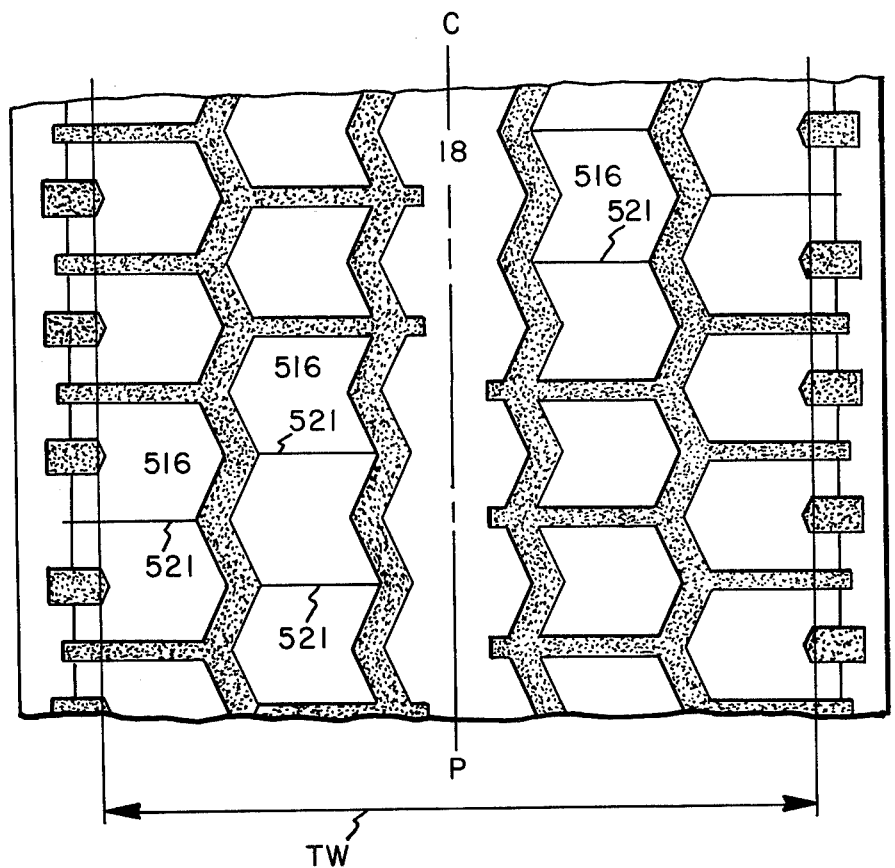

FIG. 5 illustrates another embodiment wherein narrow blades or grooves 521 are provided in the rib portions 516 and/or circumferentially extending rib 18. These narrow grooves or blades close up at the tread surface when in the footprint of the tire.

While certain representative embodiments and details have been shown for the purposes of illustrating the invention, it will be apparent to those skilled in the art that various changes and modifications may be made therein without departing from the spirit or scope of the present invention.

I claim:

1. A pneumatic truck tire having a ground engaging tread portion characterized by said tread portion having at least two circumferentially extending rows of ground engaging relief elements, each row comprising circumferentially alternating rib portions and block portions, each of said rib portions and block portions having a substantially identical circumferential length ranging from about 20% to 200% of the length of the footprint of said tire, each of said rib portions comprising a single circumferential relief element, each of said block portions comprised of at least two separate circumferential relief elements of substantially identical length separated by a groove, said rib portions and block portions are arranged about the circumference of the tire such that the block portions of one row are substantially axially adjacent the rib portions of the other row so that the net contact area of the tread in the footprint of the tire is substantially constant during rotation of said tire, said relief elements of said block portions in said footprint having an area between 30% and 50% of the net contact area of said tire.

2. The tire according to claim 1 further characterized by said tread is provided with at least one continuous circumferentially extending rib in the central portion of said tread.

3. The tire according to claim 2 further characterized by said rib portions and said centrally located rib are each provided with at least one blade extending substantially across said rib or rib portion.

4. The tire according to claim 1 further characterized by said rib portions and block portions having a circumferential length no greater than about 100% of the length of the footprint.

5. The tire according to claim 1 further characterized in that the circumferential length of each said rib portions and block portions is in the range of 30% to 50% of the footprint length of said tire.

6. The tire according to claim 1 further characterized in that said relief elements of said block portions in said footprint having an area of about 35% of the net contact area.

7. The tire according to claim 1 further characterized in that said tire is of the radial type construction.

* * * * *